(12) United States Patent
Ono

(10) Patent No.: US 7,408,675 B2
(45) Date of Patent: Aug. 5, 2008

(54) PRINT CONTROLLER, PRINT CONTROL METHOD, AND PRINT CONTROL PROGRAM

(75) Inventor: Satoru Ono, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 912 days.

(21) Appl. No.: 10/743,539

(22) Filed: Dec. 23, 2003

(65) Prior Publication Data

US 2004/0174548 A1  Sep. 9, 2004

(30) Foreign Application Priority Data

Dec. 27, 2002  (JP) ............................. 2002-379157
Sep. 22, 2003  (JP) ............................. 2003-329973

(51) Int. Cl.
  *H04N 1/60*  (2006.01)
(52) U.S. Cl. ....................... 358/1.9; 345/589
(58) Field of Classification Search ................. 358/1.9; 345/589

See application file for complete search history.

(56) References Cited

U.S. PATENT DOCUMENTS

| | | | |
|---|---|---|---|
| 4,500,919 A | 2/1985 | Schreiber | |
| 5,502,580 A * | 3/1996 | Yoda et al. | 358/518 |
| 6,046,820 A * | 4/2000 | Konishi | 358/1.9 |
| 6,281,984 B1 * | 8/2001 | Decker et al. | 358/1.9 |

FOREIGN PATENT DOCUMENTS

JP       2000-062253 A    2/2000

* cited by examiner

*Primary Examiner*—King Poon
*Assistant Examiner*—Nathan K Tyler
(74) *Attorney, Agent, or Firm*—Sughrue Mion, PLLC

(57) ABSTRACT

In case print operation is performed using only a single ink, a problem arises. If a profile is referred to, it is impossible to use only the single ink. If a profile is not referred to, the color tone differs from that rendered when with respect to the single color, color conversion is carried out referring to a profile. Input image data wherein colors are rendered by the combinations of a plurality of color component values is acquired. Then, the input image data is transformed into output image data wherein colors are rendered by the combinations of gradation values corresponding to ink colors used in a printing device when print operation is performed. At this time, a color conversion table for transforming a specific color in input image data into output image data wherein colors rendered only by a specific color component value are specified is generated, referring to a previously stored profile. With respect to the specific color, color conversion is carried out, referring to the color conversion table, when print operation is performed.

8 Claims, 11 Drawing Sheets

PRINT CONTROLLER, PRINT CONTROL METHOD, AND PRINT CONTROL PROGRAM

BACKGROUND OF THE INVENTION

1. Field of the Invention

The present invention relates to a print controller, a print control method, and a print control program.

2. Description of the Prior Art

Recent printers are utilized in so-called press simulation wherein a publication such as a catalog is printed on trial by the designer before a printing service provider prints it. In conventional press simulation (e.g. Japanese Patent Prepublication No. 2000-62253 (page 3)), color management is implemented. This is a mechanism for outputting substantially constant colors independently of differences in printing medium or printer. More specific description will be given. Profiles wherein the color components in input image data and the color components in output image data can be transformed into coordinates in a non-equipment-dependent color space, such as Lab, are stored beforehand. (* is usually affixed to L, a, and b, like L*a*b* but it is omitted in this specification for simplicity. This is the same with the following description.) Profiles correspond to printing media and the like with which print operation is performed. By using a profile meeting printing conditions, a designer's print result and a printing service provider's print result can be matched with each other.

In printers, inks of a plurality of color components are recorded, and a plurality of colors are rendered by subtractive color mixture. To meet users' needs, the above-mentioned press simulation is sometimes constituted so that print operation can be performed using only a single ink or an ink in a specific color. However, if with respect to a pixel whose color components are the same as this ink, color conversion is carried out referring to a profile, a problem arises. The color is not converted into a color for which only the single ink or the ink in the specific color is specified. Instead, it is converted into a color rendered by a combination of a plurality of ink colors different in hue. Consequently, when use of only a single ink is specified, color print operation is sometimes performed as follows: with respect to pixels wherein only the same color components as this ink have a gradation value greater than 0, print operation is performed without color conversion referring to a profile. (That is, print operation is performed without changing gradation values.)

If print operation is performed using only a single ink, a problem results. If a profile is referred to, it is impossible to use only the single ink. If a profile is not referred to, the color tone differs from that rendered when with respect to the single color, color conversion is carried out referring to a profile. As an example, it is assumed that an attempt is made to print a single color of K (black). If a profile is referred to, K can be rendered by a combination of three colors of CMY (C: cyan, M: magenta, Y: yellow). Black rendered by this combination and black rendered singly by K ink are different from each other in color tone. Especially, when gradations are printed, differences in color tone are remarkable.

SUMMARY OF THE INVENTION

The present invention has been made with the above problems taken into account. The object of the present invention is to provide a print controller, a print control method, and a print control program wherein even if print operation is performed using only a single color ink in press simulation, color management can be implemented with reliability.

According to the present invention, to attain the above object, profiles stored beforehand are referred to and a color conversion table for a specific color is generated when print operation is performed. Then, with respect to pixels for which only the same specific color as the ink color is specified in input image data, color conversion is carried out referring to the color conversion table and print operation is performed. Needless to add, at this time, a profile utilized when input image data is printed is referred to generate the color conversion table. That is, a profile corresponding to a printing medium and the like specified when print operation is performed is referred to. As the result of this print operation, only the ink in the specific color is used and yet pixels for which only the specific color is specified can be printed in the color specified in the profile. Therefore, even if an image containing a color for which any ink color used in a printing device is specified is printed, a print result wherein color management has been implemented can be obtained.

A color conversion table is generated to transform input image data into output image data. When an instruction to print input image data is given, a color conversion table for converting colors specified by that input image data is generated. Therefore, it is unnecessary to generate beforehand a color conversion table for converting a color rendered by only the color components of a specific color. Even if any profile is added after the manufacture of a printing device, such an operation as adding this color conversion table is completely unnecessary. According to the present invention, inks may be coloring material containing pigment or dye or may be so-called toner. The former is applicable to ink jet printers and the like, and the latter is applicable to laser printers and the like.

An example of constitutions for embodying the present invention is such that: colors in input image data are rendered by color component values in a first color space and colors in output image data are rendered by color component values in a third color space. In this case, it is made possible to convert the former into colors in a second color space according to a first profile and the latter into colors in the second color space according to a second profile. More specific description will be given. To do press simulation, such a constitution that input-side profiles and output-side profiles are stored beforehand is generally adopted. With this constitution, colors in input image data are converted into colors in the second color space which is a non-equipment-dependent color space according to a first profile. Further, the colors in the second color space are converted into colors in output image data according to a second profile.

Therefore, by storing profiles respectively corresponding to a plurality of printing media beforehand, any change in the situation, such as change of printing media, can be easily coped with. Press simulation can be done on the assumption that print operation is performed in different situations, for example, by a designer and by a printing service provider. In this constitution, colors in image data, which are equipment-dependent colors, are brought into correspondence with non-equipment-dependent colors by profiles. Therefore, by referring to profiles, colors rendered only by specific color component values in the first color space and colors rendered only by specific color component values in the third color space can be easily brought into correspondence with each other in an equipment-dependent color space. "Being rendered only by specific color component values" means that color components other than that of specific color component values do not contribute to the identification of a color. Hereafter, a color rendered only by specific color component values will be referred to as "specific color." Consideration will be given to a case where color component values in a color space are represented by gradation values and a gradation value of 0 means that the contribution of that color component is zero. In this case, a color wherein only a specific color component has a gradation value greater than 0 and the other color components than the specific color component have a gradation value of 0 is specific color.

If the correspondence between these colors is known, a color conversion table can be generated by defining the correspondence between them in the form of table data. At this time, only a specific color can be defined in table data both in the first color space and in the third color space. Thus, when print operation is performed using an ink in this color, color management can be implemented while the print operation is being performed.

When print operation is performed using only specific colors, as mentioned above, the specific color in the first color space and the specific color in the third color space may be different from each other. Or, they may be colors in the same family. An example of different specific colors is a case where image data is data containing three colors of RGB (R: red, G: green, B: blue) as color components and print operation is performed with a printing device using CMYK inks. That is, the present invention is applicable to cases where print operation is performed using only K ink for pixels for which achromatic colors are specified in image data. An example of specific colors in the same family (similar in hue) is a case where image data is data containing four colors of CMYK as color components and print operation is performed with a printing device using CMYK inks. That is, the present invention is applicable to cases where print operation is performed using only K ink for pixels wherein a gradation value of 0 is specified for the components other than K in image data.

Various techniques can be adopted for generating a color conversion table. For example, a plurality of specific colors can be extracted, and the correspondence can be established in the second color space with respect to the extracted colors. At this time, it can be judged whether colors can be considered as the same color depending on whether the colors are within a predetermined color difference. Therefore, color difference can be used as an index for the establishment of correspondence.

More specifically, specific colors can be extracted from profiles. Thus, with respect to a large number of specific colors, color component values in the second color space can be acquired by interpolation referring to these colors. Consequently, for example, a second profile is referred to, and a large number (l pieces) of color component values in the second color space are acquired with respect to specific colors in the third color space. Then, a first profile is referred to, and a plurality (n pieces: n<l) of color component values in the second color space are acquired with respect to specific colors in the first color space. If colors whose color difference from each other in the second color space is a predetermined value or below are taken as the same color, the respective specific colors can be considered as the same color. Thus, the specific colors in the first color space and the specific colors in the third color space can be brought into correspondence with each other. Needless to add, a large number of color component values in the second color space may be acquired with respect to specific colors in the first color space. Then, a plurality of color component values in the second color space may be acquired with respect to specific colors in the third color space.

If sets can be made as mentioned above, colors in the first color space and colors in the third color space are in correspondence with each other at least in these sets. Therefore, specific colors for which correspondence has not been established can be brought into correspondence by interpolation. As a result, with respect to a color rendered only by a specific color component value, a color conversion table can be generated. This color conversion table defines the correspondence between color component values in the first color space and color component values in the third color space over the whole range of value of that color component.

Various techniques can be adopted for this interpolation. Two sets close to each other may be extracted from the sets in correspondence, and specific colors equivalent to the interspace between the two sets maybe interpolated from the gradation values of the colors in the two sets. Thereby, the color component value of a color rendered only by a specific color component value may be calculated. Or, all of the sets may be subjected to fitting by a spline curve, Bezier curve, or the like, and the gradation value of a specific color may be calculated from this curve. In the above description, a large number of specific colors are extracted from either the first color space or the third color space, and a plurality of specific colors smaller in number than that are extracted from the other. Needless to add, a larger number of color component values in the second color space may be extracted with respect to specific colors both in the first color space and in the third color space. Then, colors whose color difference from each other is a predetermined value or below may be combined in a set without carrying out interpolation.

According to the present invention, a color conversion table is not stored beforehand so that specific colors can be converted with respect to image data to be printed. Instead, a color conversion table for specific color is generated referring to ordinary profiles when print operation is performed. Therefore, if ordinary profiles to be referred to when image data is printed are stored beforehand, a color conversion table required for printing the image data can be generated with ease. Though profiles are stored beforehand, they only has to have been stored when image data is printed. Therefore, measures can be taken to make sure that a plurality of profiles can be stored, and profiles can be added as required. Then, print operation can be performed according to the added profiles.

At this time, to conform to a plurality of profiles, including added profiles, as appropriate, it only has to be possible to select a profile specified when image data is printed. For example, such a constitution that data indicating the types of printing medium, printer, profile, and the like is created from printing conditions specified when print operation is performed can be adopted. Then, the data is added to the header of image data to be printed. With this constitution, an arbitrary profile can be selected and a color conversion table can be generated with ease by causing a color conversion table generating unit to refer to the header.

Further, recent printing devices are sometimes so constituted that they can be loaded with a plurality of inks, different in density represented as per unit ink quantity, to richly represent gradations. The density of inks is varied by varying the concentration of coloring material in solvent. The present invention is also applicable to this case. More specific description will be given. A third color space containing a plurality of inks, different in density, as color components will be supposed. Here, colors rendered only by specific color component values in the above-mentioned third color space are rendered only by color component values corresponding to a plurality of the inks different in density.

At this time, in a color conversion table, colors rendered only by specific color component values in the first color space are in correspondence with colors in the above-mentioned third color space rendered only by color component values corresponding to a plurality of inks different in density. Therefore, a specific color in the first color space is transformed into color component values corresponding to a plurality of inks. To generate a color conversion table, a substitution ratio of deep ink and pale ink is determined in advance. Colors are rendered only by color component values corresponding to either ink at first, and according to the substitution ratio some of the color component values are substituted by color component values corresponding to the other ink.

A substitution ratio is equivalent to the quantity of pale ink which can be substituted for a certain quantity of deep ink. The substitution may be made on the basis of weight. For example, one part deep ink may be substituted by two parts pale ink by weight. Alternatively, the substitution may be made on the basis of area occupied on a printing medium or on the basis of lightness on a printing medium. Or, other various constitutions can be adopted. For a plurality of ink colors different in density, various colors different in the concentration of coloring material in solvent can be adopted. Inks substantially identical in hue and different in density, for example, deep black and pale black and deep cyan and pale cyan, can be adopted. Needless to add, colors are not limited to black and cyan. The present invention is also applicable to a printing device in which inks in three types of density, not in two types, deep and pale, can be loaded.

As mentioned above, a technique wherein a color conversion table is generated when print operation is performed and the table is utilized in printing is implemented in a substantive device. In this sense, it is easily understood that the present invention can be embodied also as a substantive device. That is, the present invention is also effective as a substantive device.

Such a substantive device can be solely implemented, or can be incorporated into some equipment and implemented together with another method. Thus, the philosophy of the present invention is not limited to these aspects but can be implemented in various embodiments. The embodiments of the present invention can be modified as appropriate, and the present invention may be embodied in software or in hardware.

If the philosophy of the present invention is embodied in software for generating and utilizing a color conversion table when print operation is performed, the philosophy of course exists on a recording medium with such software recorded thereon. The philosophy is utilized in such a form.

Needless to add, the constitutions of the various concrete embodiments mentioned above can be adapted to the above-mentioned substantive device or program. Further, any recording medium can be used to provide the program. For example, it may be a magnetic recording medium or a magneto-optic recording medium, and this is the same with any recording medium that will be developed in the future. Also, if the present invention is embodied partly in software and partly in hardware, that is completely the same in the philosophy of the invention. This includes such an embodiment that part of the program is recorded on a recording medium and is read in as required. Further, the foregoing is completely the same with the phases of reproduction, such as primary duplicate copies and secondary duplicate copies, completely without question.

DESCRIPTION OF THE PREFERRED EMBODIMENTS

Figure 1:
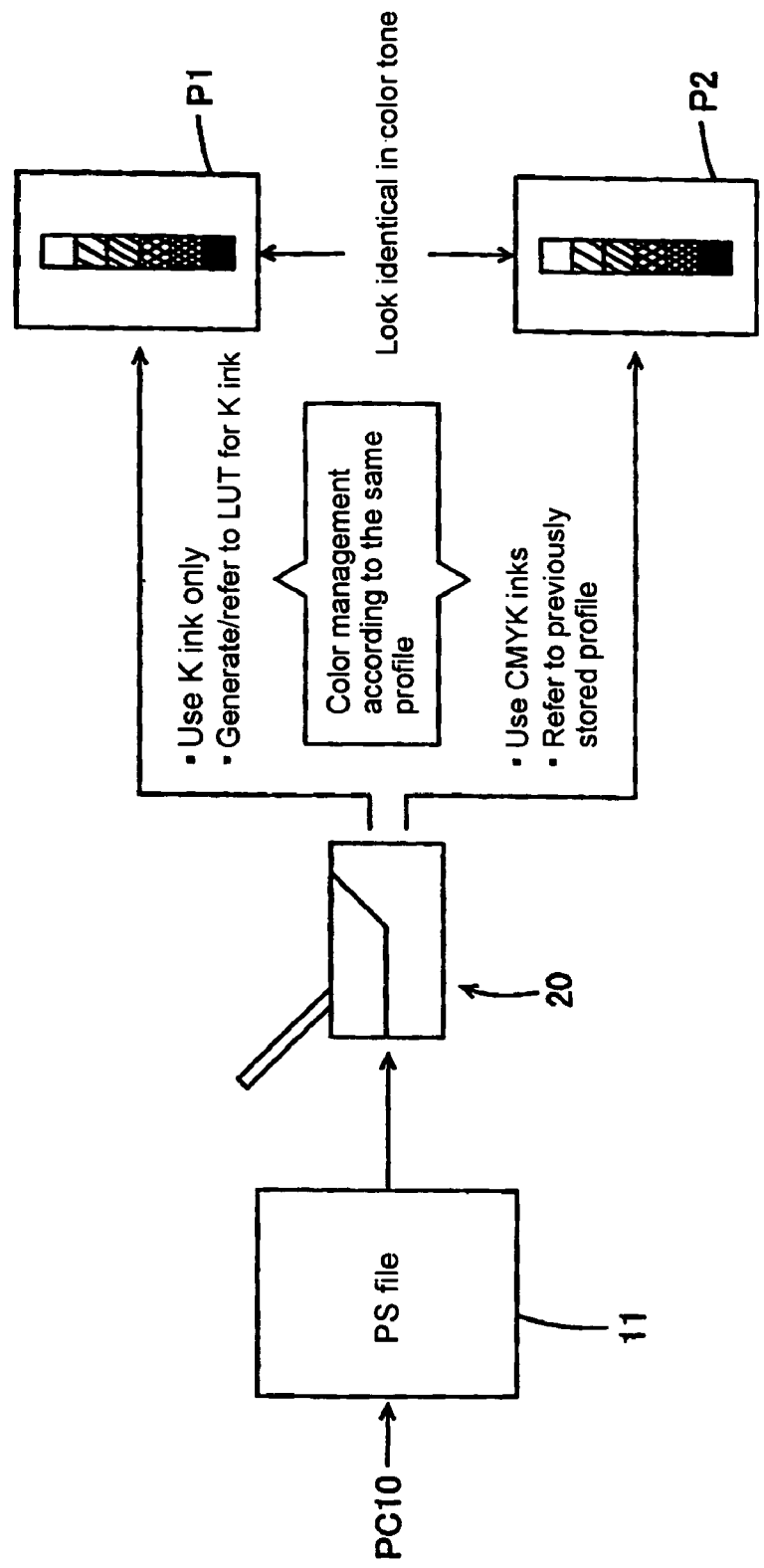
FIG. 1 is an explanatory drawing schematically illustrating print control processing and the effect thereof.

Here, embodiments of the present invention will be described in the following order:
(1) General Description of Print Control:
(2) Constitution of Print Controller:
(3) Generate LUT:
(4) Other Embodiments:

(1) General Description of Print Control:

FIG. 1 is an explanatory drawing schematically illustrating the print control according to the present invention and the effect thereof. In this embodiment, a PS file 11 (PostScript file. PostScript is a trademark of Adobe Systems Incorporated.) created in PC 10 is transferred to a printer 20. The PS file 11 is analyzed and printed in the printer 20. In the printer 20, so-called press simulation can be executed. That is, color management according to profiles is carried out. Thus, output of the same color tone is obtained when print operation is performed based on common image data with a printing device used for printing service providers to print in large quantities and with the printer 20.

In this embodiment, in an image to be printed generated by analyzing the PS file 11, the colors at individual pixels are specified by the gradation values of CMYK colors. Further, in the printer 20, colors are rendered by specifying the ink quantities of inks in CMYK colors by gradation values. Here, the gradation values of CMYK are related to equipment-dependent colors, and the colors can vary from equipment to equipment even if the gradation values of CMYK are common. Consequently, the above-mentioned color management according to profiles is adopted.

More specific description will be given. CMYK image data obtained by analyzing the PS file 11 is taken as an input value, and CMYK image data which specifies the ink quantities of inks in CMYK colors is taken as output values. A profile for transforming the input values and the output values into component values in the Lab color space (non-equipment-dependent color space) is stored in the printer 20. Then, color conversion for transforming the input values into the output values is carried out utilizing the profile. By carrying out this color management, the same image can be printed with the same color tone even if any printing condition, such as printing paper and the model of the printer 20, is changed.

In the following description, the above-mentioned CMYK image data taken as input values is referred to as "input CMYK image data," and the CMYK image data taken as output values is referred to as "output CMYK image data." In this embodiment, in both, a gradation value of 0 indicates a color which does not contain the color component. Further, color components are represented with gradations by values up to a predetermined maximum value (e.g. a gradation value of 255). A color determined by gradation values in input CMYK image data and a color determined by gradation values in output CMYK image data are different from each other even if their gradation values are identical. The first color space referred to in relation with the present invention corresponds to a color space composed of the color component values in input CMYK image data in this embodiment. The third color space referred to in relation with the present invention corresponds to a color space composed of the color component values in output CMYK image data in this embodiment. The second color space corresponds to the Lab color space in this embodiment.

The lower part of FIG. 1 illustrates a situation in which a black gradation image is printed with the printer 20. More specific description will be given. When the image is printed, a profile matched with the situation of printing is selected from among profiles stored beforehand in the printer 20. Then, based on CMYK image data obtained from the profile, print operation is performed using inks in CMYK colors. As a result, such a print as printing paper P2 is obtained.

Even if image data is monochromatic, part of the monochromatic color is converted into so-called composite black which is a combination of CMY colors when a profile is referred to. Thus, print operation is performed using color inks other than K ink as well. However, some user may desire a print using only ink in a specific color. For example, a user may desire to use only K ink in printing in black and white. The printer 20 in this embodiment is so constituted as to meet such needs. In addition, when this print operation is performed as well, color management is carried out, and a color conversion table (LUT) for K ink is generated. Thus, the same image can be printed in the same colors under different printing conditions.

The LUT for K ink is generated by selecting profiles matched with the situation of printing from among profiles stored beforehand in the printer 20 and referring to them. For pixels wherein only K has a gradation value greater than 0 and C, M, and Y have a gradation value of 0, the LUT for K ink is referred to when color conversion is carried out. If use of only K ink is specified when a black gradation image is printed as mentioned above, such a print as printing paper P1 shown in FIG. 1 is obtained. As mentioned above, LUT for K ink is generated referring to a profile. This profile is a profile referred to if use of only K ink is not specified when an input image is printed. Therefore, in the result P1 of print operation performed using only K ink and in the result P2 of print operation performed using inks in CMYK colors, the color is determined based on the same profile. For this reason, the print result P1 and the print result P2 look identical in color tone.

Figure 2:
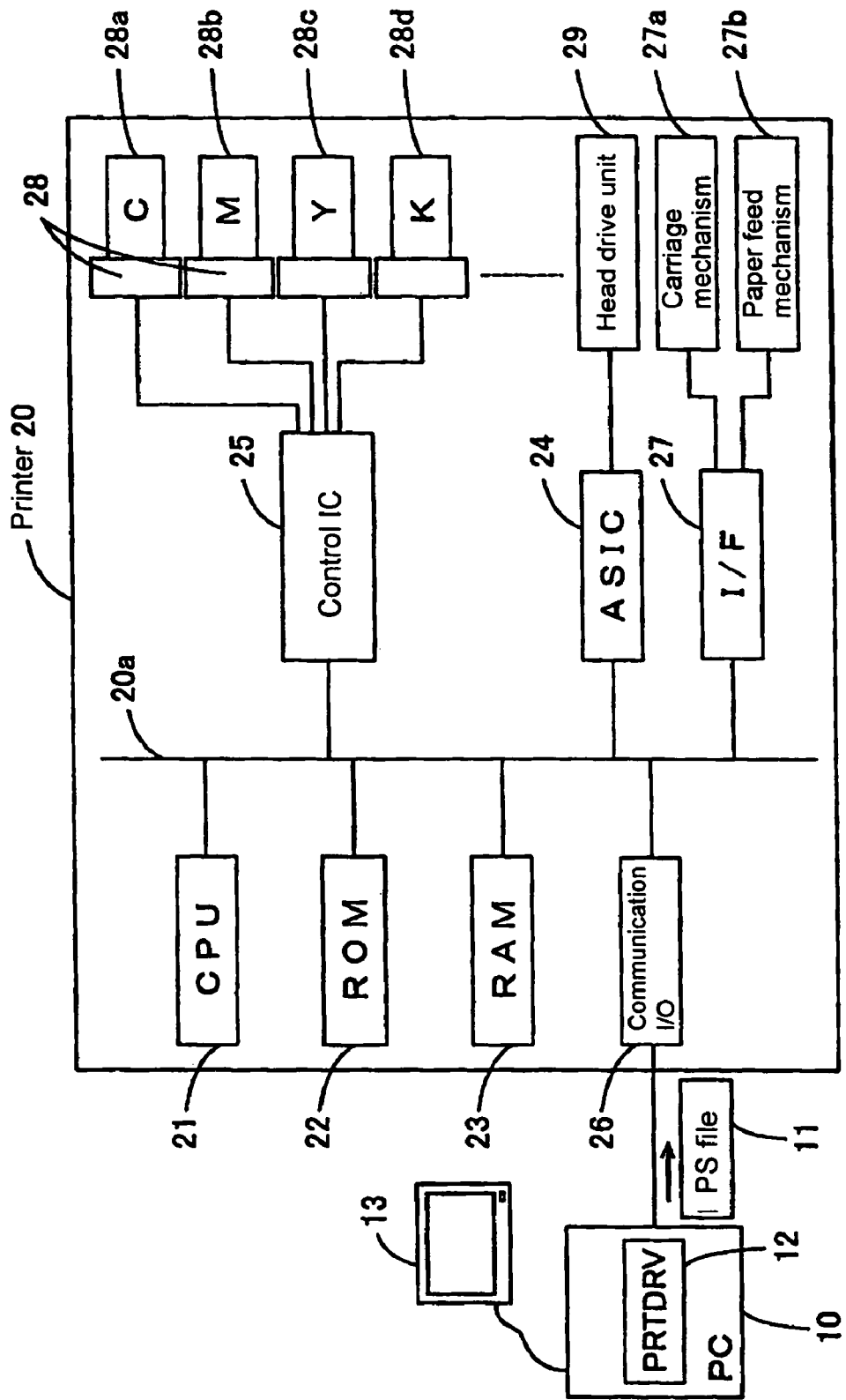
FIG. 2 is a drawing illustrating the hardware configuration of a printer.
Figure 3:
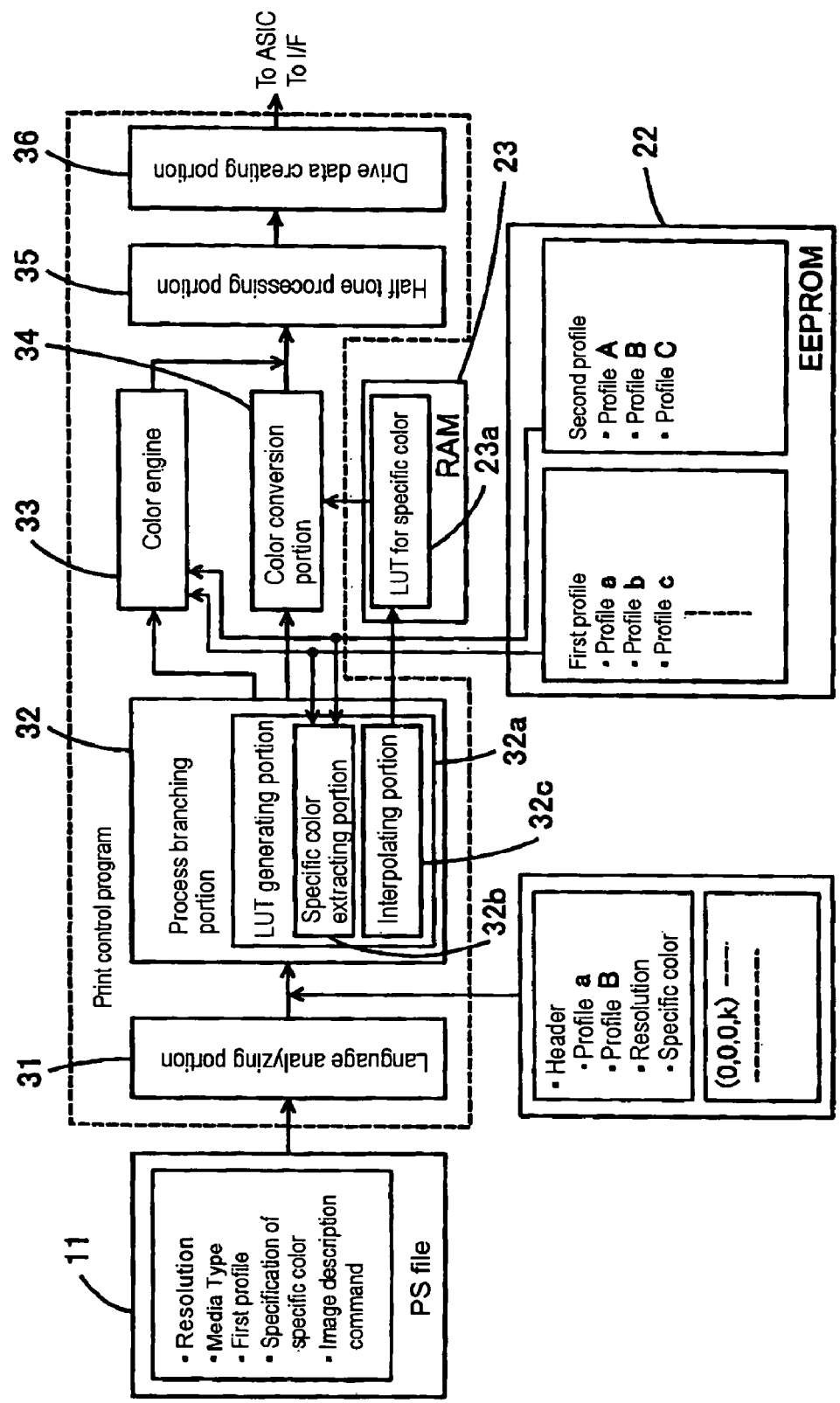
FIG. 3 is a functional block diagram of the program executed on the printer.

(2) Constitution of Print Controller:

Next, the constitution of a device for implementing the above-mentioned print control will be described. FIG. 2 illustrates the hardware configuration of the printer 20, and FIG. 3 is a functional block diagram illustrating a program executed in the printer 20 for exercising print control. In FIG. 2, the PC 10 is a general-purpose personal computer, which is connected with a display 13 and an operation input device (not shown). The user operates the operation input device, viewing an image shown on the display 13. Thereby, the user can generate an image to be printed and give an instruction to perform print operation. In the PC 10, a printer driver (PRTDRV) 12 can be run under the control of OS. When the above instruction to perform print operation is given, the PRTDRV 12 creates a PS file 11 and transmits the file to the printer 20 through a communication line. In the PS file 11, printing conditions, such as printing paper and the model of the printer 20 and the details of the image to be printed and fonts are described.

In the printer 20, CPU 21, EEPROM 22, RAM 23, ASIC 24, a control IC 25, a communication I/O 26, and an I/F 27 are connected with one another through a bus 20a. The communication I/O 26 is connected with the printer I/F 19 of the PC 10, and the printer 20 receives PS files 11 transmitted from the PC 10 through the communication I/O 26.

Cartridge holders 28 are loaded with CYMK ink cartridges 28a to 28d, and the inks in the ink cartridges 28a to 28d are supplied to a print head (not shown) on a color-by-color basis. The ASIC 24 transmits and receives predetermined signals to and from the CPU 21, and outputs to a head drive unit 29 data which indicates whether to record ink at each pixel. Based on this data, the head drive unit 29 generates an applied voltage pattern to the piezoelements built in the print head and causes the four color inks to be discharged on a dot-by-dot basis in accordance with resolution.

On the ink discharge face of the print head, four sets of rows of nozzles which discharge inks in four colors are formed so that the rows of nozzles are arranged in the direction of the main run of the print head. In each row of nozzles, a plurality of nozzles are arranged in line at equal intervals in the direction of auxiliary run. A carriage mechanism 27a and a paper feed mechanism 27b connected with the I/F 27 cause the print head to make main runs. The mechanism 27a and 27b also perform new page beginning operation as appropriate and sequentially feed a medium to make auxiliary runs. The CPU 21 utilizes the RAM 23 as a work area and controls the individual parts according to the programs written in the EEPROM 22. More specifically, the CPU 21 outputs data to the ASIC 24 and transmits and receives signals to and from the control IC 25. Further, the CPU 21 controls the carriage mechanism 27a and the paper feed mechanism 27b by outputting signals to the I/F 27.

In this embodiment, the print control program according to the present invention can be executed in the program execution environment comprising the CPU 21, the RAM 23, and the EEPROM 22. This print control program comprises a language analyzing portion 31, a process branching portion 32, a color engine 33, a color conversion portion 34, a half tone processing portion 35, and a drive data creating portion 36, as illustrated in FIG. 3. The PS file 11 received through the communication I/O 26 is passed to the language analyzing portion 31, and the PostScript language is interpreted there. The PS file 11 contains information indicating the Media Type, a first profile, the specification of specific colors and image description commands. Varied information is determined in the PRTDRV 12 when execution of print operation is specified.

Figure 4:
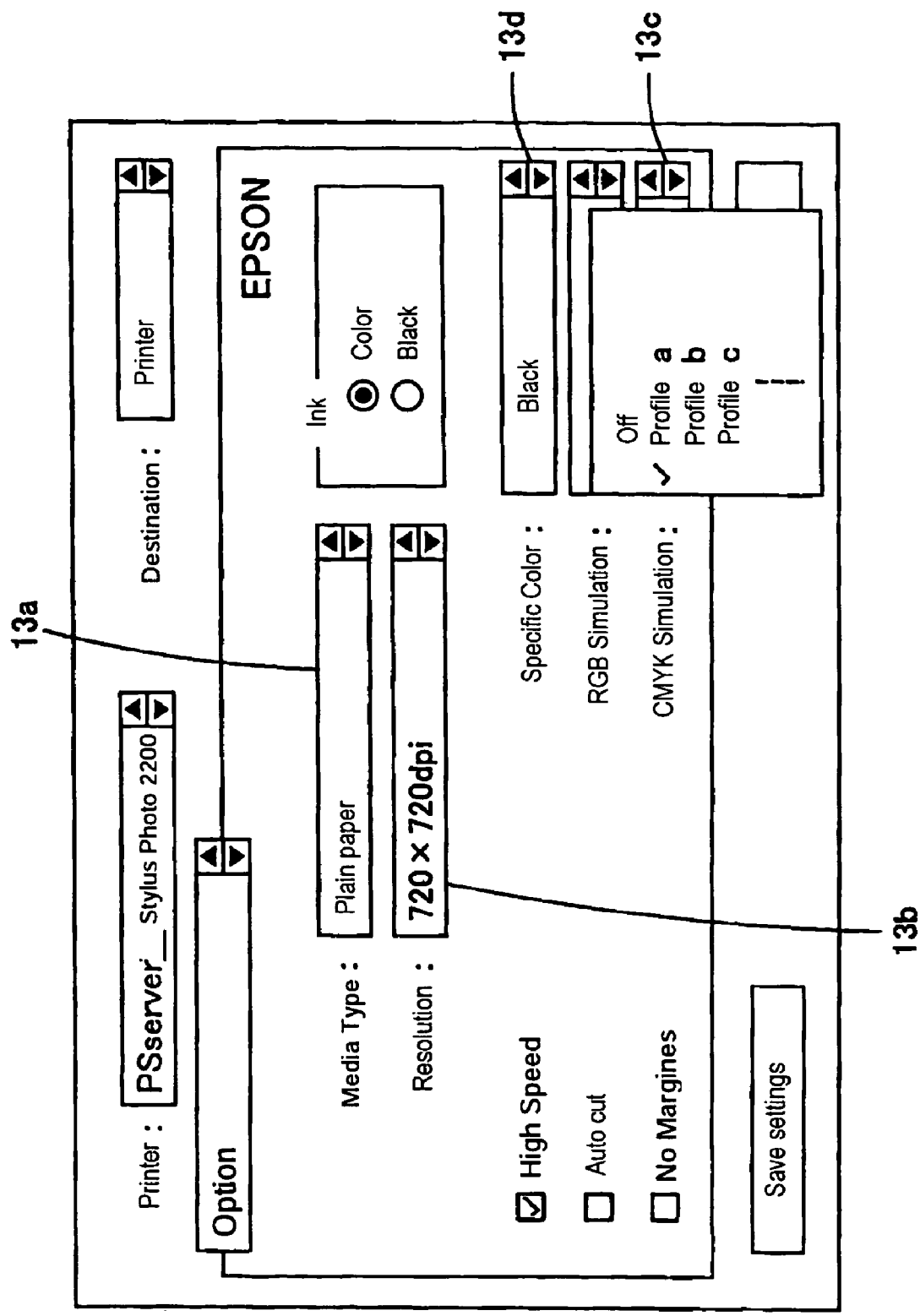
FIG. 4 is a drawing illustrating GUI shown on a display.

FIG. 4 is an explanatory drawing illustrating how these pieces of information are specified. The figure shows GUI (Graphical User Interface) shown on the display 13 under the control of the PRTDRV 12. With this GUI, the user can select various options, such as functions carried out with the printer 20, through select boxes and radio buttons. For example, the Media Type select box 13a allows the user to specify the Media Type, such as plain paper and photo paper. The Resolution select box 13b allows the user to specify a print resolution, such as 720 (horizontal)×720 (vertical) dpi and 2880 (horizontal)×1440 (vertical) dpi.

The CMYK Simulation select box 13c allows the user to specify a first profile (referred to as "simulation profile" in general) for transforming gradation values in input CMYK image data into Lab gradation values in the Lab color space. FIG. 4 illustrates the way selection is made in the CMYK Simulation select box 13c, and the user selects a desired one from among displayed candidates for profile. The Specific Color select box 13d allows the user to specify a desired specific color from among the ink colors loaded in the printer 20.

The settings made through the GUI illustrated in FIG. 4 may be made beforehand, or the GUI may be displayed each time print operation is performed. In either case, a resolution, the Media Type, a first profile, and a specific color are specified when print operation is performed, and these pieces of information are described in the PS file 11. Image description commands which indicate an image to be printed and fonts are also created and described in the PS file 11.

Figure 5:
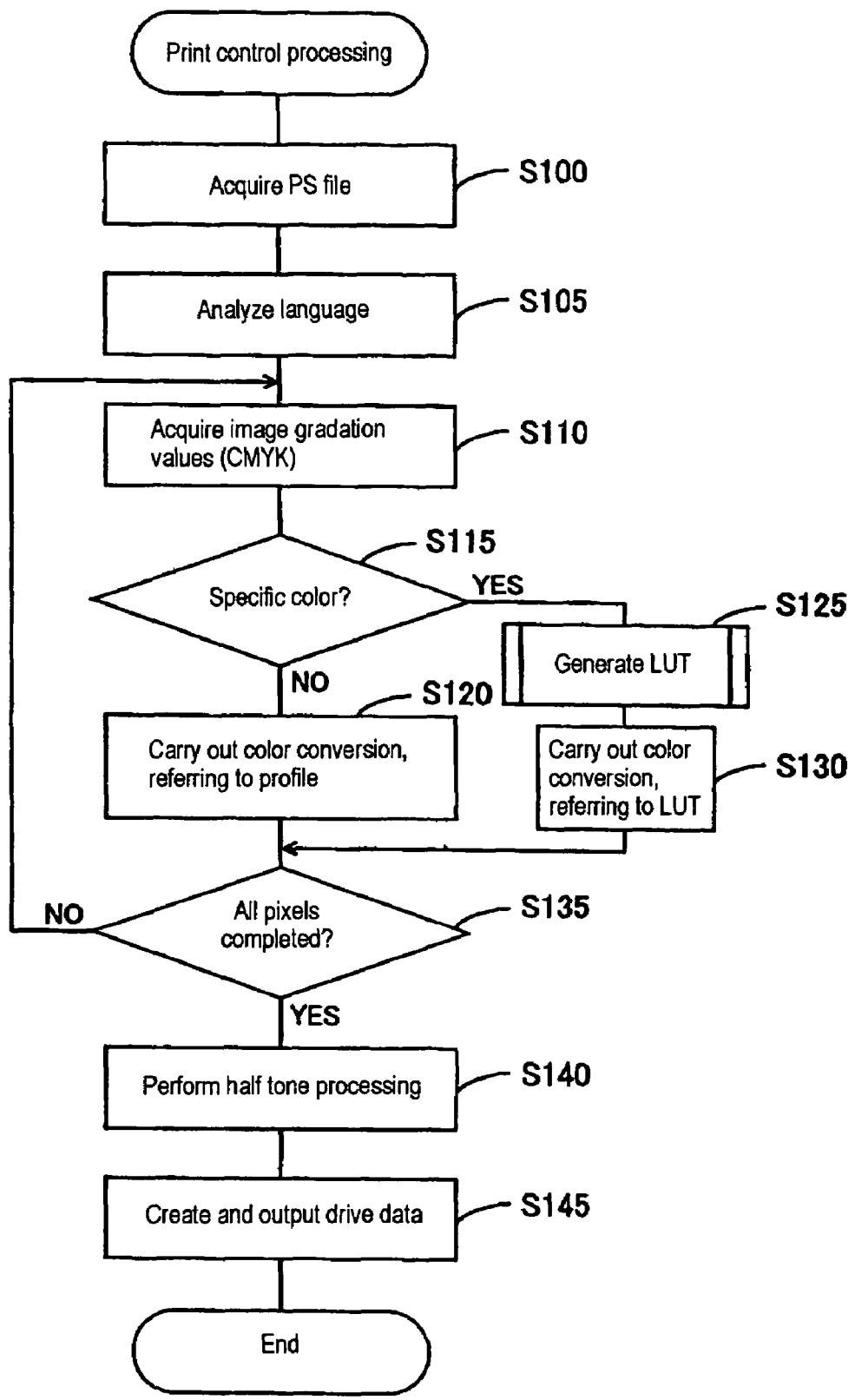
FIG. 5 is a flowchart illustrating the process of the print control.

In this embodiment, based on the settings illustrated in FIG. 4, print control processing is performed according to the flowchart illustrated in FIG. 5. First, the language analyzing portion 31, illustrated in FIG. 3, acquires this PS file 11 (Step 100), and analyzes various commands described in the PostScript language (Step 105). More specifically, the language analyzing portion 31 analyzes the image description commands and forms characters and images to be printed of pixels in a matrix pattern. Further, the language analyzing portion 31 creates input CMYK image data wherein the color at each pixel is rendered by gradation values of CMYK colors. Furthermore, the language analyzing portion 31 describes data indicating a first profile and a second profile, data indicating the above specific color, and data indicating a print resolution in the header of the input CMYK image data.

The second profile is a plurality of profiles (referred to as "media profiles" in general) stored in the printer 20 with respect to each condition, such as the Media Type and the type of ink. The second profile is referred to when colors indicated by output CMYK image data wherein the ink quantities of inks in CMYK colors are specified by gradation values are transformed into Lab gradation values in the Lab color space. The first profile and the second profile only have to be data which makes it possible to transform CMYK image data into non-equipment-dependent colors. These pieces of data can be constituted of data wherein lookup tables and functions such as tone curve are specified.

In this embodiment, a plurality of first profiles and second profiles are stored in the EEPROM 22. This embodiment is so constituted that profiles can be added later by adopting EEPROM as nonvolatile memory. Needless to add, the recording medium is not limited to EEPROM but a hard disk may be adopted. If such a constitution that a profile can be added is unnecessary, an ordinary ROM may be adopted.

The language analyzing portion 31 is capable of analyzing the PS file 11 and thereby grasping the printing paper and the like when print operation is performed. Therefore, the language analyzing portion 31 grasps a second profile matched with printing conditions from the information including the printing paper and the like, and describes it in the header. Once information is described in a predetermined format in the header by the language analyzing portion 31 and an image is constituted of input CMYK image data, the modules in the printer 20 can utilize them to perform processing. That is, these pieces of data are passed to the process branching portion 32, and the process branching portion 32 acquires the input CMYK image data with respect to each pixel (Step 110). Then, the portion 32 judges whether the acquired colors of pixels are a specific color rendered only by a specific color component value (Step 115).

If the color is not a specific color, the pixel concerned is passed to the color engine 33, which is in turn caused to carryout color conversion (Step 120). If the color is a specific color, the pixel concerned is passed to the color conversion portion 34, which is in turn caused to carry out color conversion (Steps 125 and 130). However, the color conversion portion 34 is so constituted that the portion 34 refers to a LUT 23a for specific color when carrying out color conversion, as described later (Step 130). Therefore, after the process branching portion 32 grasps a specific color according to data analyzed by the language analyzing portion 31, the LUT 23a for specific color for carrying out color conversion with respect to the specific color is generated (Step 125).

This process will be described later. For one time of print operation, the specific color is fixed. Consequently, if Generate LUT processing is performed once at Step 125, that is sufficient for one time of print operation. Therefore, it is judged whether a LUT 23a for specific color has been generated with respect to the specific color to be subjected to color conversion. If it has been generated, the Generate LUT processing of Step 125 is skipped.

The color conversion portion 34 is a module which carries out color conversion referring to LUTs 23a for specific color. More specific description will be given. In the input CMYK image data passed from the process branching portion 32 to the color conversion portion 34, any of color components only has a gradation value greater than 0, and the other color components have a gradation value of 0. The LUT 23a for specific color defines the correspondence between input CMYK image data and output CMYK image data with respect to this color component. Thus, by referring to the LUT 23a for specific color, input CMYK image data can be easily transformed into output CMYK image data. The output CMYK image data obtained as the result of color conversion by the color conversion portion 34 is saved into a buffer for image data, ensured in the RAM 23.

The color engine 33 is a module which carries out color conversion referring to the first profile and the second profile. More specifically, the color engine 33 carries out interpolation or the like referring to the first profile, and thereby transforms the input CMYK image data, passed from the process branching portion 32 to the color engine 33, into Lab values. Further, the color engine 33 transforms the Lab values into output CMYK image data by interpolation or the like referring to the second profile. The output CMYK image data obtained as the result of color conversion by the color engine 33 is saved into the buffer for image data, ensured in the RAM 23.

As mentioned above, at Step 120 or Step 130, the color of each pixel is converted, and the obtained output CMYK image data is saved into the buffer. Then, it is judged whether color conversion has been completed with respect to all the pixels in the input CMYK image data to be printed (Step 135). If it is not judged at Step 135 that color conversion has been completed with respect to all the pixels, the processing of Step 110 and the following steps is repeated. If it is judged at Step 135 that color conversion has been completed with respect to all the pixels, the half tone processing portion 35 transforms the individual color gradation values in the output CMYK image data accumulated in the above-mentioned buffer for image data into dot data. The dot data indicates whether to discharge ink with respect to each pixel (Step 140). Based on the dot data, the drive data creating portion 36 creates data for driving the head drive unit 29, carriage mechanism 27a, and paper feed mechanism 27b (Step 145). Then, the drive data creating portion 36 supplies the data to the ASIC 24 and the I/F 27.

As a result, the image which underwent color conversion in the color engine 33 or the color conversion portion 34 is printed in the printer 20. As mentioned above, in this embodiment, color conversion is carried out referring to the LUT 23a for specific color with respect to pixels for which a specific color is specified. This LUT 23a for specific color is generated referring to the first and second profiles stored beforehand for carrying out color management. Therefore, color management can be carried out with reliability even if a specific color is specified and print operation is performed utilizing an ink in the specific color.

Figure 6:
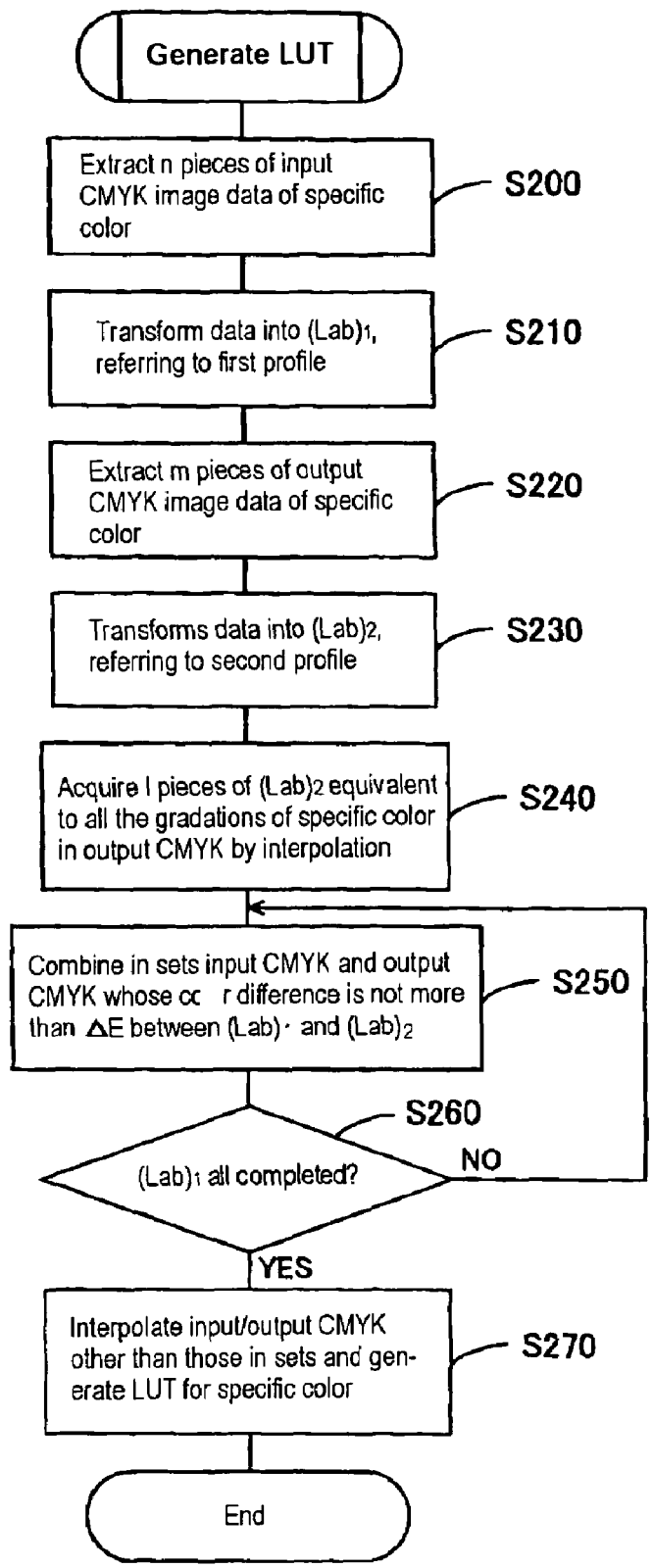
FIG. 6 is a flowchart illustrating the process of Generate LUT.

(3) Generate LUT:

As mentioned above, it is such a constitution that a LUT 23a for specific color is generated when print operation is performed that guarantees that color management is carried out with respect to a specific color. Consequently, the process of Generate LUT of Step 125 will be described in detail below. FIG. 6 is a flowchart illustrating the process of Generate LUT at Step 125. A LUT generating portion 32a is a module which generates LUTs 23a for specific color, and comprises a specific color extracting portion 32b and an interpolating portion 32c. In the process of Generate LUT, the process branching portion 32 actuates the LUT generating portion 32a before passing the input CMYK image data for the first pixel to the color conversion portion 34.

The specific color extracting portion 32b extracts n pieces of specific color (n is a natural number not more than 256. 16 or so is preferable.) referring to the first profile. The portion 32b extracts m pieces of specific color (m is a natural number not more than 256. 16 or so is preferable.) referring to the second profile. Then, the specific color extracting portion 32b calculates the Lab values thereof (Steps 200 to 230). The first profile and the second profile referred to here are profiles described in the header of data passed from the language analyzing portion 31. The specific color is a color described in the header of data passed from the language analyzing portion 31. Hereafter, the Lab values corresponding to the input CMYK image data will be represented as (Lab)1 and the Lab values corresponding to the output CMYK image data will be represented as (Lab)2.

More specifically, arbitrary n pieces of specific color are extracted from the input CMYK image data (Step 200), and these n pieces of specific color are transformed into n pieces of (Lab)1, referring to the first profile (Step 210). Further, arbitrary m pieces of specific color are extracted from the output CMYK image data (Step 220), and these m pieces of specific color are transformed into m pieces of (Lab)2, referring to the first profile (Step 230). This extraction maybe made from arbitrary input CMYK image data and output CMYK image data. However, to carry out color conversion with accuracy over the whole range of gradation values greater than 0 in the specific color, it is preferable that specific colors should be substantially uniformly extracted over the whole range of value. Needless to add, if accurate color conversion is desired for some of the ranges of gradation values, it is preferable that a larger number of specific colors should be extracted from these ranges of gradation values.

The (Lab)1 and (Lab)2 converted as mentioned above are brought into correspondence with the input CMYK image data and output CMYK image data from which the transformation was carried out, and are stored in the RAM 23. The interpolating portion 32c is capable of carrying out interpolation. First, the portion 32c carries out interpolation with respect to the specific color calculated from the second profile, referring to the output CMYK image data thereof and the (Lab)2. Thus, the interpolating portion 32c calculates the Lab values (Lab)2 with respect to l pieces of specific color (Step 240). If the output CMYK image data is in 256 gradations, l is a natural number not more than 256. l>m, and the l is preferably 256 or so. If 256 is taken, m is subtracted from it, and 256-m pieces only have to be calculated by interpolation.

By this interpolation, the correspondence between specific color and Lab value is obtained with respect to a large number of pieces of output CMYK image data. The LUT generating portion 32a combines in sets those whose color difference from each other is a predetermined value ($\Delta E$) or below of l pieces of (Lab)2 and n pieces of (Lab)1 (Step 250). As mentioned above, l pieces of (Lab)2 and n pieces of (Lab)1 are calculated independently of each other. Since l is greater, however, a set with the color difference not more than $\Delta E$ can be combined with respect to substantially all the pieces of (Lab)1.

In this sense, the maximum number of sets is n. However, even if the number of sets with the color difference not more than $\Delta E$ is less than n, a number close to n of sets can be generated. If there are a plurality of pieces of (Lab)2 whose color difference from a certain piece of (Lab)1 is not more than $\Delta E$, those of the smaller color difference can be combined in a set. As mentioned above, sets of (Lab)1 and (Lab)2 are generated using $\Delta E$ as an index. Then, it is judged whether processing for generating a set has bee performed with respect to all of n pieces of (Lab)1 (Step 260). The above-mentioned processing of Step 250 is repeated until it is judged that all has been completed.

If it is judged at Step 260 that the processing for generating a set has been completed with respect to all of n pieces of (Lab)1, data wherein n sets at the maximum are tabulated with respect to the input CMYK image data and the output CMYK image data is created. Referring to this data defined in the form of table, interpolation is further carried out. Thus, a LUT 23a for specific color which defines the correspondence between input CMYK image data and output CMYK image data with respect to all the gradation values of the specific color is generated (Step 270). This LUT 23a for specific color is saved into a work area in the RAM 23.

Figure 7:
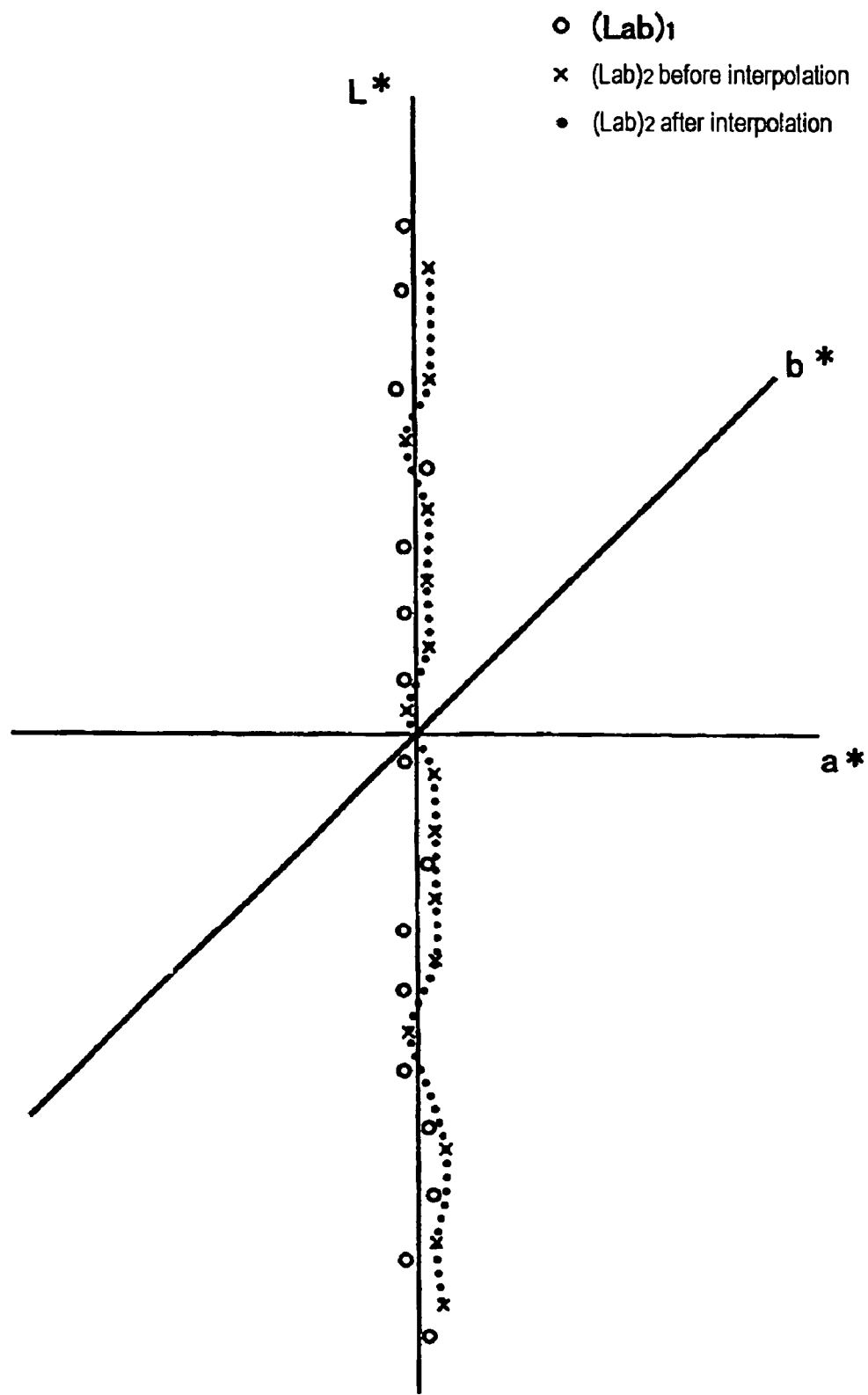
FIG. 7 is a drawing schematically illustrating the way Lab values are extracted.
Figure 8:
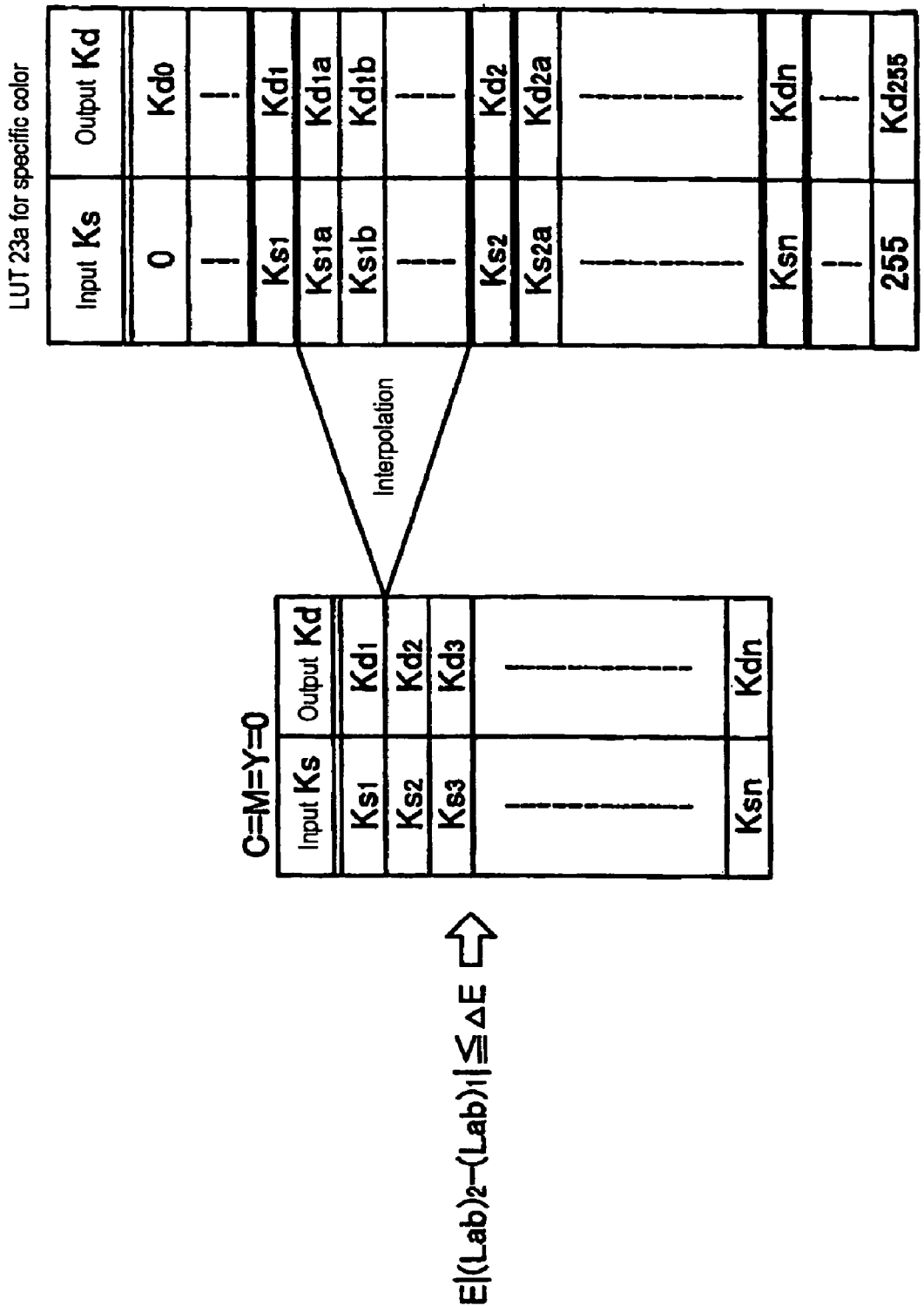
FIG. 8 is a drawing schematically illustrating data processing performed in Generate LUT.
Figure 9:
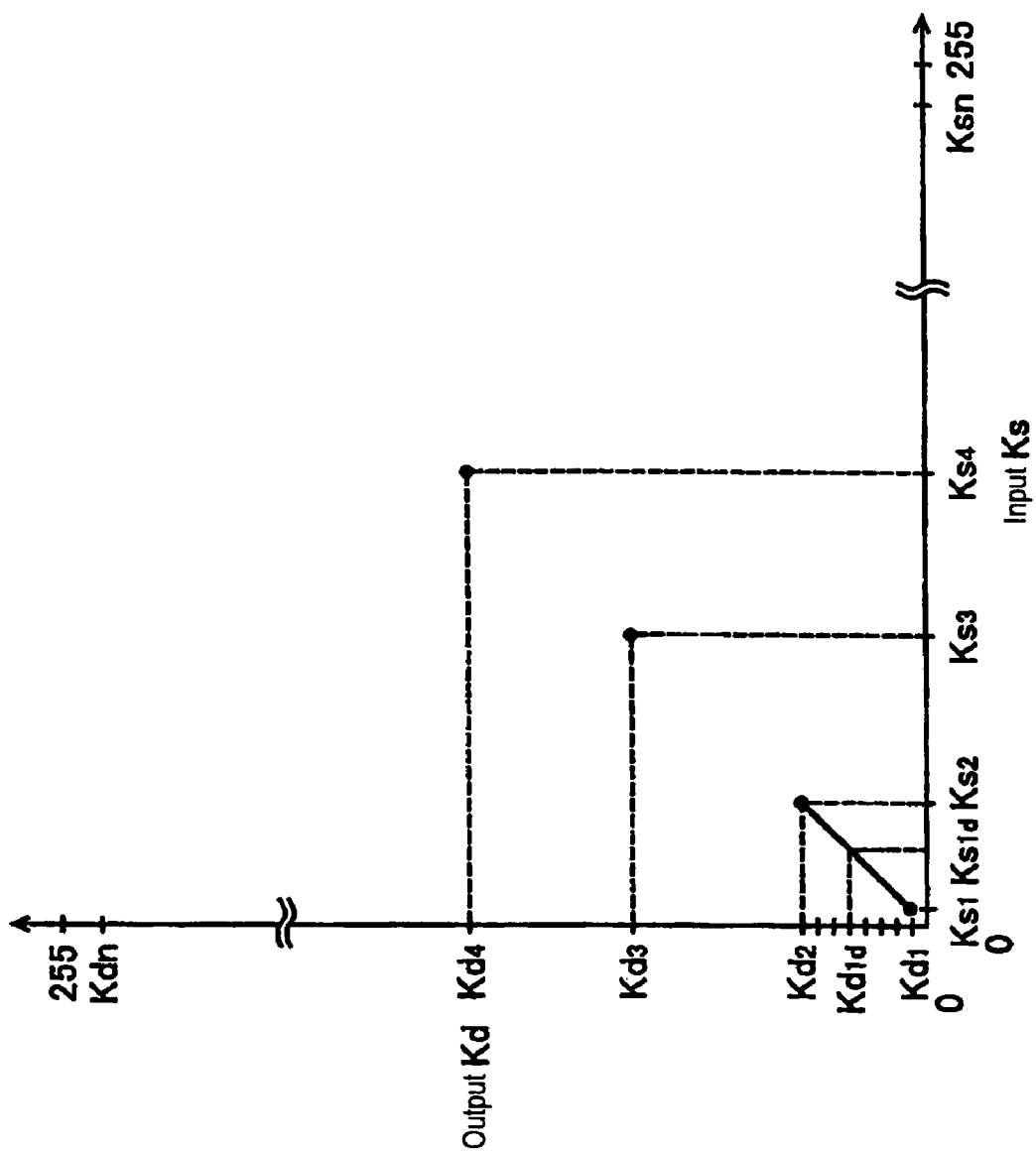
FIG. 9 is a drawing schematically illustrating interpolation.

Next, the above-mentioned processing will be described with a concrete example taken. FIG. 7 is a drawing schematically illustrating how Lab values corresponding to CMYK image data are extracted in the process of Generate LUT. FIG. 8 is a drawing schematically illustrating data processing performed in the process of Generate LUT. FIG. 9 is a drawing schematically illustrating interpolation carried out at Step 270. These figures illustrate a case where the specific color is black. In case of general printing services, there are great needs for black for the specific color, that is, printing using black ink only. In printing in black and white using black ink only, tone jump and variation in color tone from equipment to equipment are especially prominent in monochromatic images. The present invention is especially effective when the specific color is black.

When input CMYK image data of black is transformed into (Lab)1 at Steps 200 and 210, n pieces of (Lab)1 indicated by hollow circle in FIG. 7, are obtained in the Lab space. When output CMYK image data of black is transformed into (Lab)2 at Steps 220 and 230, m pieces of (Lab)2, indicated by x in FIG. 7, are obtained in the Lab space. Black in CMYK image data is intrinsically an achromatic color, and should exist on the L-axis in the figure. To be exact, however, it has a value other than 0, though the value is small, as a-value and b-value, and is distributed in proximity to the L-axis.

The above output CMYK image data of black is data which has a value greater than 0 only for black, and the individual gradation values of black are away from one another. Therefore, by interpolating data equivalent to the interspace between them at Step 240, l points indicated by black dot in FIG. 7 are obtained. (This interpolation is the same as the processing with the second profile referred to.) By acquiring a larger number of pieces of (Lab)2 for n pieces of (Lab)1 in the Lab space, as mentioned above, sets can be generated using ΔE as an index.

Consequently, with respect to n pieces of (Lab)1, (Lab)2 which makes the color difference equal to or less than ΔE is searched as illustrated in FIG. 8. (In FIG. 8, E|(Lab)2−(Lab)1| represents color difference.) Then, those which satisfy this condition are combined in a set, as mentioned above. As a result, a table which defines the sets of input CMYK image data and output CMYK image data is generated as shown in the center of FIG. 8. In this example, the specific color is black, and C=M=Y=0. Therefore, only the gradation value of K will be considered. In the figure, the gradation value of K in input CMYK image data is taken as Ks, and the gradation value of K in output CMYK image data is taken as Kd. Thus, n pieces of gradation value are discriminated as Ksn or Kdn. If the correspondence between input Ks and output Kd can be defined as mentioned above, the subsequent processing can be performed only by K-values independently of the Lab space.

The table shown in the center of the figure defines the correspondence with respect to n pieces of Ks and Kd at the maximum. Consequently, in this embodiment, Kd corresponding to gradation values between Ksn and Ksn+1 is determined by interpolation at Step 270. Here, the gradation values between Ksn and Ksn+1 are represented as Ksna, Ksnb, . . . , and the gradation values between Kdn and Kdn+1 are represented as Kdna, Kdnb, . . . Various techniques can be adopted for this interpolation. For example, the technique illustrated in FIG. 9 can be adopted.

The figure illustrates an example of the way n pieces of correspondence are plotted with input Ks taken on the horizontal axis and output Kd taken on the vertical axis. More specifically, the correspondences of from Ks1 and Kd1 to Ksn and Kd1 are plotted as black dots. As illustrated in the figure, the correspondence is established with respect to n points of 256 gradations in input Ks and output Kd. Therefore, with respect to gradation values between points, the correspondence can be defined by a straight line connecting two adjacent points.

For example, the coordinate value of output Kd corresponding to input Ks1d, on the straight line connecting (Ks1, Kd1) and (Ks2,Kd2) is taken as Kd1d, as illustrated in FIG. 9. Thus, with respect to an arbitrary gradation value, the correspondence between input Ks and output Kd can be defined. Needless to add, processing to take the coordinate value of input Ks corresponding to output Kd1d, on the straight line connecting (Ks1,Kd1) and (Ks2,Kd2) as Ks1d may be performed. In either case, the thus created data which indicates the correspondence is a LUT 23a for specific color.

(4) Other Embodiments

The above-mentioned embodiment is an example. Various embodiments can be adopted as long as color management is carried out with reliability when print operation is performed using a specific color only. In the above embodiment, by specifying a specific color, color conversion referring to a LUT 23a for specific color is carried out when input CMYK image data is a specific color. However, such a constitution that whether to carry out color conversion referring to the LUT 23a for specific color can be determined in further detail may be adopted.

For example, in the GUI illustrated in FIG. 4, the object of printing using only ink in a specific color may be selectable from options, including, for example, image only, font only, and all images and fonts, in addition to the specification of specific color. This constitution can be implemented as follow: when an object to be printed is transformed into input CMYK image data at the language analyzing portion 31, data indicating that each pixel is in an image or font is added. Referring to this data, the process branching portion 32 passes only the specific color and the specified object to be printed to the color conversion portion 34 and the other pieces of data to the color engine 33. With this constitution, an object the user desires to print can be subjected to color management without fail.

In the above description, the specific color is specified by the user. Alternatively, predetermined specific colors may be always passed to the color conversion portion 34 to carry out color conversion referring to the LUT 23a for specific color. With this constitution, when print operation is performed utilizing only a specific color, color management can be automatically carried out even if the user is unconscious of that. Needless to add, the specific color is not limited to black. As mentioned above, with respect to black, tone jump and variation in color tone from equipment to equipment are likely to be prominent. The present invention is especially effective when the specific color is black. Consequently, such a constitution that in printing in black and white, only K ink is used even if black is not explicitly specified for specific color may be adopted. Then, print operation is performed referring to the LUT 23a for specific color.

In the above-mentioned embodiment, the LUT 23a for specific color is generated prior to color conversion for the first pixel when an image to be printed is printed. The LUT 23a for specific color only has to have been stored in the RAM 23 when color conversion is carried out. Therefore, Generate LUT processing maybe started after the first and the second profiles are grasped by the language analyzing portion 31. Or, it may be started after the settings are made through the GUI illustrated in FIG. 4. Or, LUT may be generated when the processing load is reduced, for example, when the printer 20 is started or at idle.

In case of print operation utilizing the same profile, a LUT 23a for specific color once created may be used again. For example, a LUT 23a for specific color maybe generated after settings are made through the GUI illustrated in FIG. 4, and it may be kept stored until the settings are changed through the GUI. Or, the frequency of use of profiles may be measured, and LUTs 23a for specific color may be generated beforehand for profiles high in the frequency of use. With these constitutions, it is avoided to generate LUT immediately before color conversion, and the print control processing is accelerated.

In the above-mentioned process of Generate LUT, (Lab)1 is acquired with respect to n pieces of input CMYK image data, and (Lab)2 is acquired with respect to a large number of pieces of output CMYK image data. Needless to add, (Lab)2 may be acquired with respect to n pieces of output CMYK image data, and (Lab)1 may be acquired with respect to a large number of pieces of input CMYK image data. Or, a large number of Lab values may be acquired with respect both to input CMYK image data and to output CMYK image data. Then, a LUT 23a for specific color may be generated by extracting a large number of sets with the color difference not more than ΔE in the Lab space.

In the above-mentioned embodiment, input CMYK image data is transformed into output CMYK image data by color conversion. Needless to add, the constitution is not limited to this in terms of number of colors or color component. For example, the present invention may be applied to a printer which uses inks in six colors of CMYKlclm or in seven colors of CMYKlclmDY, not in four colors of CMYK. (lc refers to light cyan; lm refers to light magenta; and DY refers to dark yellow.) In this case, the present invention is applied when input/output image data is subjected to color conversion. With this constitution, the present invention can be applied to a very wide range of printers.

Figure 10:
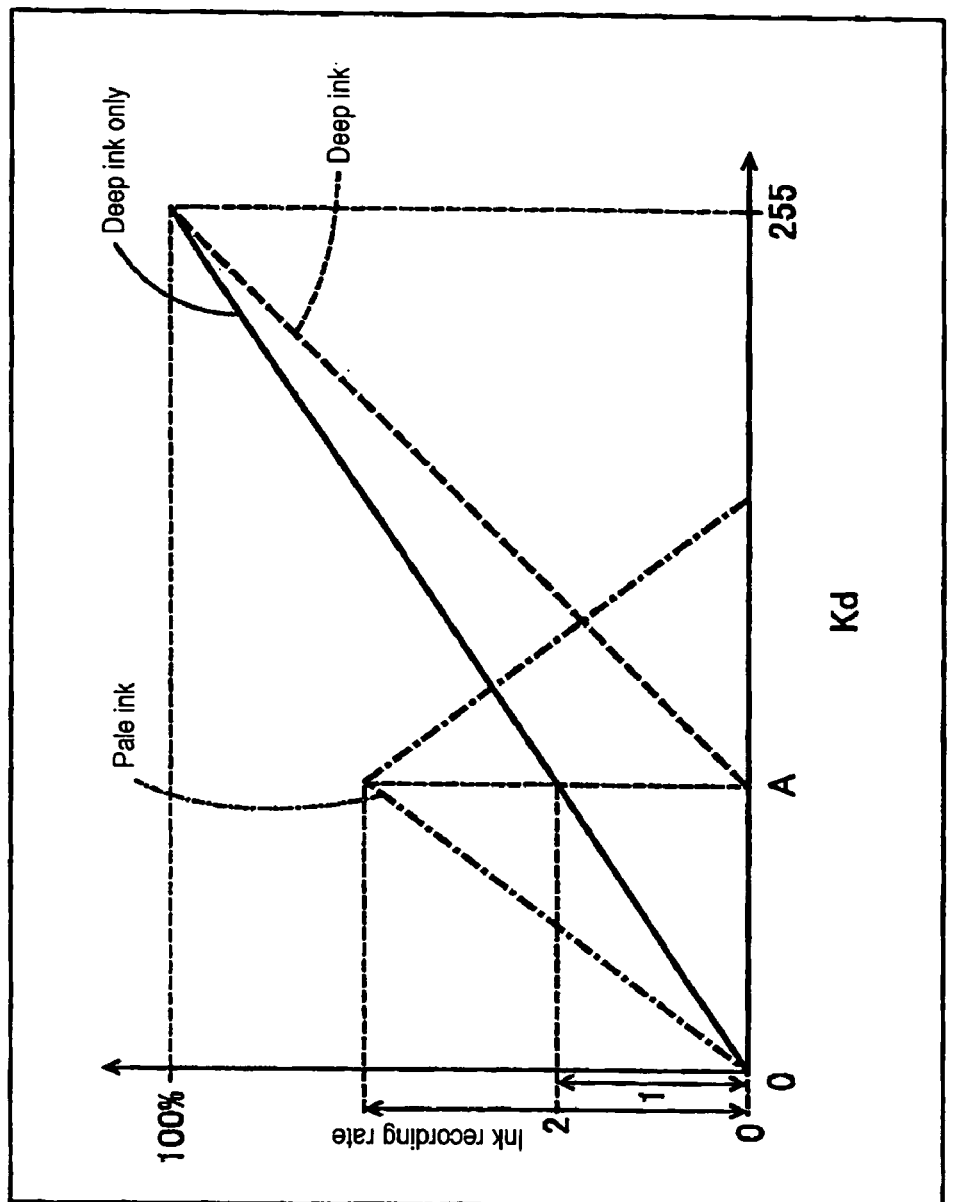
FIG. 10 is an explanatory drawing illustrating a constitution wherein LUT for performing print operation using deep and pale inks.
Figure 10:
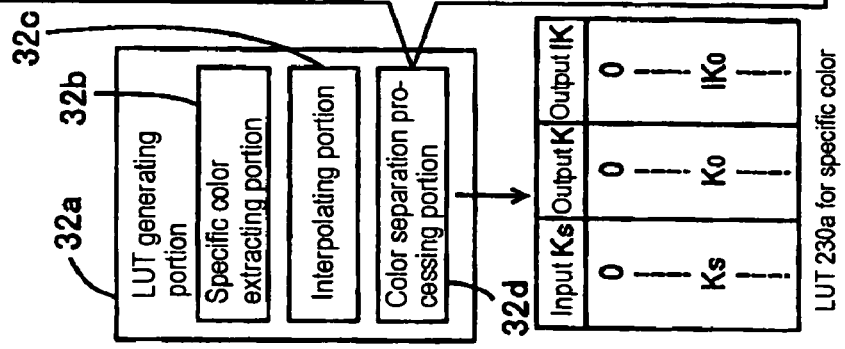

Further, the present invention may be applied to a printer which can be loaded with a plurality of inks different in density. In this case, the present invention is applied when all of a plurality of the inks different in density are equivalent to the above mentioned specific color. As an example, a printer loaded with two types of black ink, deep ink and paler ink, will be taken. In this case, if the specific color is black, a LUT for specific color for performing print operation using both the inks can be generated. FIG. 10 is an explanatory drawing illustrating such a case. In this case, a LUT for specific color for subjecting a specific color rendered only by specific color component value to color conversion is generated, but there are a plurality of the specific color components.

In this case, the major part of the constitution is the same as in the above-mentioned embodiment. The example illustrated in FIG. 10 is different from the above embodiment in the constitution of the LUT generating portion 32*a* and generated LUTs 230*a* for specific color. Unlike the printer 20, the printer in the example can be loaded with two types of K ink, deep and pale, instead of inks in four colors of CMYK. In addition to the same specific color extracting portion 32*b* and interpolating portion 32*c* as in the above embodiment, the LUT generating portion 32*a* further comprises a color separation processing portion 32*d*. By the specific color extracting portion 32*b* and the interpolating portion 32*c*, LUT shown on the right of FIG. 8 is generated. However, in the embodiment illustrated in FIG. 10, the color separation processing portion 32*d* further subjects the LUT to the processing illustrated in FIG. 10. The portion 32*d* thereby generates a LUT 230*a* for specific color for outputting output CMYK image data wherein the gradations in black are represented by combinations of deep ink and pale ink.

More specific description will be given. In LUT generated by the LUT generating portion 32*a* after interpolation by the interpolating portion 32*c*, input Ks and output Kd are in correspondence with each other. Thus, Kink as output is rendered by one type of output Kd, that is, by a single color component. Consequently, the color separation processing portion 32*d* carries out color separation to represent the single color component by color components corresponding to two types of ink, deep and pale. In the embodiment illustrated in FIG. 10, the above-mentioned output Kd is matched with output only by deep ink. That is, the K ink loaded in the above printer 20 and the deep ink are identical in density.

Therefore, when a graph is drawn with the output Kd taken on the horizontal axis and the ink recording rate of ink recorded on a printing medium taken on the vertical axis, the graph is plotted as follows: the ink recording rate of deep ink corresponding to output Kd forms such a substantially straight solid line as shown in the center of FIG. 10. At this time, the ink recording rate corresponds to a number of dot droplets per unit area. A state in which the maximum number of dot droplets that can be recorded per unit area is defined as 100%.

Pale ink is used to prevent degradation in graininess and the insufficiency of the smoothness of gradation which can occur if only deep ink is used. The ink recording rates of pale ink and deep ink are determined so that deep ink can be substituted at a predetermined substitution ratio. (This is referred to as "color separation.") FIG. 10 illustrates an example wherein one part deep ink and two parts pale ink are equal to each other by ink weight. The color separation processing portion 32*d* substitutes pale ink for deep ink so that the ink weight will be equivalent to a case where deep ink is recorded in the high-lightness (low-gradation) range at a recording rate indicated by the solid line. More specific description will be given. The above-mentioned ratio of deep ink to pale ink is determined beforehand. As illustrated in FIG. 10, the originating point A of deep ink is also predetermined. The deep ink is all substituted by the pale ink when the output Kd is between 0 and the originating point A of deep ink inclusive.

That is, when the output Kd is between 0 and the originating point A of deep ink inclusive, the pale ink is outputted at an ink recording rate twice the ink recording rate of the deep ink. After the recording rate of the pale ink at the originating point A of deep ink is determined, the ink recording rate of the deep ink is determined with respect to output Kd greater than the originating point. In accordance with this ink recording rate, the ink recording rate of the pale ink is determined with respect to color component values greater than the originating point. In FIG. 10, the ink recording rates are determined so that the ink recording rate of the deep ink will be linearly increased from the originating point A of deep ink and the ink recording rate of the pale ink will be linearly decreased from the same point A.

As a result, in FIG. 10, the ink recording rate of the pale ink is determined as indicated by the alternate long and short dash line, and the ink recording rate of the deep ink is determined as indicated by the broken line. The ink recording rate of the deep ink only (solid line shown in FIG. 10) is obtained by processing by the interpolating portion 32*c*. Therefore, the color separation processing portion 32*d* refers to the values of output Kd, the ratio of deep ink to pale ink, and the originating point A of deep ink. While doing this, the portion 32*d* determines the recording rates of the pale ink and the deep ink, and generates a LUT 230*a* for specific color.

More specific description will be given. In this embodiment, the gradation values of individual color components linearly correspond to ink recording rates of 0 to 100%. Therefore, the gradation values of the individual inks are calculated from the recording rates of the pale ink and the deep ink determined as mentioned above. Then, the values of output Kd in the right LUT shown in FIG. 8 are replaced with the gradation values. The LUT 230*a* for specific color shown at the lower left of the FIG. 10 is the LUT after this replacement. This LUT 230*a* for specific color is recorded in the RAM 23, and referred to by the color conversion portion 34.

More specifically, in the same processing as illustrated in FIG. 5, the color conversion portion 34 carries out color conversion, referring to the LUT 230*a* for specific color at Step 130. As the result, the specific color is outputted as a combination of the gradation values of the deep ink and the pale ink. That is, the color conversion portion 34 outputs output CMYKlk image data. (K represents deep ink; and lk represents pale ink.) Then, after processing by the half tone processing portion 35 and the drive data creating portion 36, print operation is performed. Thus, colors rendered only by the color component values of black are printed in deep black ink and pale black ink. This combination of the deep ink and the pale ink is determined referring to the first and second profiles during processing by the LUT generating portion 32a. Thus, a print result which underwent color management is obtained.

Needless to add, the above-mentioned technique is an example, and other various constitutions can be adopted. For example, a substitution ratio may be determined beforehand so that the quantity of coloring material will be equal between deep ink and pale ink. Or, such a substitution ratio that the lightness will be equal when print operation is performed. Further, variation in the ink recording rates of pale ink and deep ink need not be linear to color component values but may be curvy. The points at which the ink recording rate of pale ink is 0 in the range of color component values greater than the deep ink originating point may be matched with the maximum value (255) of output Kd. Moreover, the specific color may be C or M ink, not K ink, and the present invention is applicable to inks in such relation that substitution can be made. Needless to add, a printer may be so constituted that inks in three or more levels of density, not just two types of density, deep and pale, can be loaded. In this case, the color separation processing portion transforms output Kd into inks in three types of density by color separation.

As mentioned above, a printer may be constituted so that a plurality of inks different in density can be loaded. In this case, the constitution to which the present invention is applied is not limited to that wherein a LUT for outputting the gradation values of deep and pale inks is generated, referring to the first and second profiles, as mentioned above. For example, the following constitution may be adopted: the LUT generating portion 32a generates a LUT 23a for specific color which defines the correspondence between input Ks and output Kd as in the first embodiment mentioned above. Then, color conversion is carried out referring to the LUT 23a for specific color, and thereafter color separation is carried out.

Figure 11:
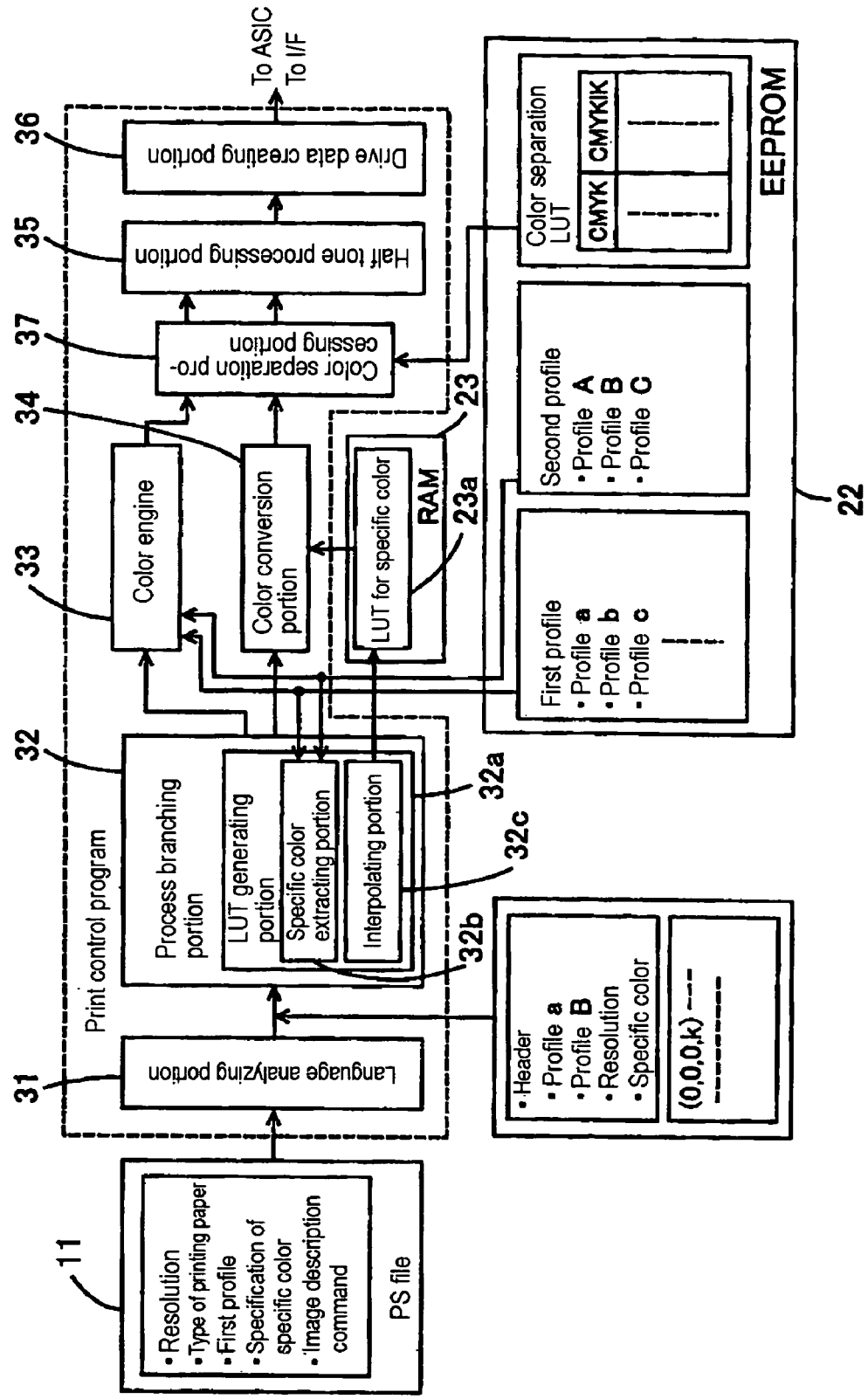
FIG. 11 is an explanatory drawing illustrating a constitution wherein print operation is performed using deep and pale inks.

FIG. 11 is a block diagram illustrating an example of this constitution. The constitution illustrated in the figure is substantially the same as in the first embodiment mentioned above. However, it is different in that a color separation LUT for color separation is recorded in the EEPROM 22 and processing by a color separation processing portion 37 is performed prior to processing by the half tone processing portion 35. More specific description will be given. The color separation LUT shown in FIG. 11 is a table wherein the gradation values of CMYK and the gradation values of CMYKlk are in correspondence with each other. The color separation LUT is referred to when output CMYK image data outputted by the color conversion portion 34 or the color engine 33 is further transformed into CMYKlk image data.

More specifically, color separation shown in the center of the FIG. 10 is carried out beforehand to acquire image data which represents the K component in output CMYK image data by K component and lk component. Needless to add, the color separation LUT is defined so that output CMYK image data wherein C=M=Y=0 and only K has a gradation value greater than 0 can be transformed into CMYKlk image data wherein C=M=Y=0 and only K and lk have a gradation value greater than 0. The color separation processing portion 37 is a module which carries out color conversion referring to the color separation LUT. With respect to output CMYK image data outputted by the color conversion portion 34, the portion 37 transforms the K components into K and lk components, referring to the color separation LUT.

With respect to the output CMYK image data outputted from the color engine 33, interpolation is carried out, referring to the color separation LUT. Thus, the gradation values of CMYK are transformed into the gradation values of CMYKlk. With this constitution, the output CMYK image data outputted from the color conversion portion 34 is subjected to color conversion referring to the LUT 23a for specific color, and a print result which underwent color management is obtained. Therefore, the above substitution ratio, the originating point of deep ink, and the like may be determined beforehand so that color management will be carried out in color separation in the color separation LUT. Thus, color management can be implemented even if the operation goes through the color separation processing portion 37. In the above description, the color separation LUT is that which underwent color separation with respect to K and lk. Needless to add, the color separation LUT may be LUT which underwent color separation with respect to C and lc or M and lm. With such a LUT, other colors than K can be taken as the specific color.

In the above-mentioned embodiment, the color component values are matched with each other between input image data and output image data. These may be different from each other. For example, when input image data is RGB image data, output image data may be CMYK image data and vice versa. In this case, a specification can be made so that K ink will be used in the printer, and color conversion referring to a LUT for specific color can be carried out with respect to pixels for which an achromatic color (R=G=B) is specified in RGB image data. Or, like constitutions can be adopted. With these constitutions, the present invention can be applied to versatile print operation, and a wide variety of users' needs can be met. In the above-mentioned embodiment, data passed from the PC 10 to the printer 12 is PS files 11. The data is not limited to PS file but may be files in any other page description language. Or, it may be a file wherein data in a page description language and raster image data are mixed with each other. The present invention is also applicable to laser printers, in addition to ink jet printers such as the above-mentioned printer 20.

I claim:

1. A print control method in which image data wherein colors at the pixels constituting an image are rendered by color component values in a first color space is acquired and transformed into image data wherein colors at the pixels are rendered by the color component values of inks in various colors used in a printing device and the printing device is controlled when print operation is performed, the method comprising:

a step for storing beforehand on a predetermined storage medium a first profile wherein the combinations of color component values in the first color space are in correspondence with the combinations of color component values in a second color space composed of non-equipment-dependent color components and a second profile wherein the combinations of color component values in a third color space composed of the ink color components of said printing device are in correspondence with the combinations of color component values in said second color space;

a step for bringing a color rendered only by a specific color component value in said first color space and a color rendered only by a specific color component value in said third color space into correspondence with each other in the second color space, referring to said first profile and second profile, and generating a color conversion table which defines the correspondence between the color component values in the first color space which render the color and the color component values in the third color space which render the color;

a step for converting colors rendered only by the specific color component value in said acquired image data into colors rendered only by the specific color component value in the third color space, referring to the color conversion table;

a step for performing print operation based on the image data which underwent the color conversion; and a step for extracting a plurality of colors rendered only by a specific color component value from both said first profile and second profile; a step for carrying out interpolation, referring to colors calculated from either profile, to increase the number of colors rendered only by the specific color component value; a step for, if the colors increased in number and a plurality of said colors calculated from the other profile are within a predetermined color difference in the second color space, taking them as the same color and combining them to thereby establish the correspondence in said second color space; and a step for defining the correspondence between color component values in the first color space and color component values in the third color space over the whole range of value of the specific color component by interpolation referring to the sets brought into correspondence.

2. The print control method according to claim 1, wherein at least one color of the color components in said first color space and at least one color of the color components in the third color space are specific colors in the same family, and the colors rendered only by said specific color component value are the specific colors.

3. The print control method according to claim 2, wherein said specific colors are black.

4. The print control method according to claim 1, wherein in said interpolation, a curve wherein said sets brought into correspondence are taken as reference points is calculated and points on the curve are taken as interpolating points.

5. The print control method according to claim 1, wherein a plurality of profiles can be stored, and specified profiles are referred to as said first profile and second profile when said image data is printed.

6. The print control method according to claim 1, wherein said third color space contains a plurality of color components corresponding to a plurality of ink colors different in density, the method comprising a step for generating a color conversion table wherein a color rendered only by a specific color component value in the third color space is rendered by a plurality of color component values corresponding to a plurality of said ink colors different in density.

7. A print controller which controls a printing device which performs print operation utilizing inks in a plurality of colors, the print controller comprising:

an image data acquiring unit which acquires image data wherein colors at the pixels constituting an image are rendered by color component values in a first color space;

a first profile storing unit which stores first profiles wherein the combinations of color component values in the first color space and the combinations of color component values in a second color space composed of non-equipment-dependent color components are in correspondence with each other;

a second profile storing unit which stores second profiles wherein the combinations of color component values in a third color space composed of the ink color components of said printing device and the combinations of color component values in said second color space are in correspondence with each other;

a color conversion table generating unit which brings a color rendered only by a specific color component value in said first color space and a color rendered only by a specific color component value in said third color space into correspondence with each other in the second color space, referring to said first profile and second profile, and generates a color conversion table which defines the correspondence between the color component value in the first color space which indicates this color and the color component value in the third color space which indicates this color;

a color conversion unit which converts a color rendered only by a specific color component value in said acquired image data into a color rendered only by a specific color component value in the third color space, referring to said color conversion table; and a print operation performing unit which performs print operation based on the image data which underwent the color conversion;

wherein, a plurality of colors rendered only by a specific color component value from both said first profile and second profile are extracted, wherein, by referring to colors calculated from either profile, interpolation is carried out to increase the number of colors rendered only by the specific color component value, wherein, if the colors increased in number and a plurality of said colors calculated from the other profile are within a predetermined color difference in the second color space, taking them as the same color and combining them to thereby establish the correspondence in said second color space, and wherein the correspondence is defined between color component values in the first color space and color component values in the third color space over the whole range of value of the specific color component by interpolation referring to the sets brought into correspondence.

8. A computer-readable medium storing a print control program for acquiring image data wherein colors at the pixels constituting an image are rendered by color component values in a first color space and transforming the image data into image data wherein colors at the pixels are rendered by the color component values of inks in various colors used in a printing device to control the printing device when print operation is performed, wherein the program causes a computer to carry out:

a function of storing on a predetermined storage medium a first profile wherein the combinations of color component values in the first color space and the combinations of color component values in a second color space composed of non-equipment-dependent color components are in correspondence with each other and a second profile wherein the combinations of color component values in a third color space composed of the ink color components of said printing device and the combinations of color component values in said second color space are in correspondence with each other;

a color conversion table generating function of bringing a color rendered only by a specific color component value in said first color space and a color rendered only by a specific color component value in said third color space into correspondence with each other in a second color space, referring to said first profile and second profile, and generating a color conversion table which defines the correspondence between the color component value in the first color space which indicates this color and the color component value in the third color space which indicates this color;

a color conversion function of converting a color rendered only by a specific color component value in said acquired image data into a color rendered only by a color component value in the third color space, referring to the color conversion table; and a print operation performing function of performing print operation based on the image data which underwent the color conversion;

wherein, a plurality of colors rendered only by a specific color component value from both said first profile and second profile are extracted, wherein, by referring to colors calculated from either profile, interpolation is carried out to increase the number of colors rendered only by the specific color component value, wherein, if the colors increased in number and a plurality of said colors calculated from the other profile are within a predetermined color difference in the second color space, taking them as the same color and combining them to thereby establish the correspondence in said second color space, and wherein the correspondence is defined between color component values in the first color space and color component values in the third color space over the whole range of value of the specific color component by interpolation referring to the sets brought into correspondence.

* * * * *